United States Patent

Barton et al.

Patent Number: 5,864,700
Date of Patent: Jan. 26, 1999

[54] SEQUENCING AND ERROR DETECTION OF TEMPLATE INSTANTIATIONS DURING COMPILATION OF C++ PROGRAMS

[75] Inventors: John Joseph Barton, Mahopac; Michael Karasick, Pound Ridge, both of N.Y.; David Joseph Streeter, Scarborough, Canada

[73] Assignee: International Business Machines Corporation, Armonk, N.Y.

[21] Appl. No.: 766,375

[22] Filed: Dec. 12, 1996

[30] Foreign Application Priority Data

Jun. 12, 1996 [CA] Canada ................. 2 178 898

[51] Int. Cl.[6] ........................................... G06F 9/46
[52] U.S. Cl. ................................. 395/705; 395/708
[58] Field of Search .................... 395/701, 703, 395/705, 708, 672, 673, 706, 709

[56] References Cited

U.S. PATENT DOCUMENTS

| | | | |
|---|---|---|---|
| 5,179,702 | 1/1993 | Spix et al. | 395/672 |
| 5,280,617 | 1/1994 | Brender et al. | 395/703 |
| 5,303,369 | 4/1994 | Borcherding et al. | 395/674 |
| 5,375,239 | 12/1994 | Mortson | 395/703 |
| 5,604,908 | 2/1997 | Mortson | 395/705 |
| 5,630,128 | 5/1997 | Farrell et al. | 395/673 |
| 5,655,096 | 8/1997 | Branigin | 395/376 |
| 5,710,902 | 1/1998 | Sheaffer et al. | 395/392 |

*Primary Examiner*—James P. Trammell
*Assistant Examiner*—Demetra R. Smith
*Attorney, Agent, or Firm*—Jay P. Sbrollini

[57] ABSTRACT

A priority queue is used to sequence template instantiations in compiling C++ programs. If the analysis of a C++ code fragment encounters a name that requires full instantiation and no matching full instantiation exists, the parse is terminated and rescheduled, and a full instantiation is scheduled as an antecedent of the failed parse. "Antecedent" means that the failed parse code fragment will not be reparsed until after the full instantiation has succeeded. Only when the full instantiation has succeeded will the terminated parse be reconsidered. Parsing full instantiations may cause additional full instantiations. These are handled in the same manner; the additional instantiation is scheduled, and the current parse is failed and rescheduled. At the time of scheduling, the antecedent instantiation is marked with its dependent, so that the dependent chain give the chronology of the instantiation. This makes it easy to generate historical or "traceback" information for meaningful error messages.

24 Claims, 3 Drawing Sheets

SEQUENCING AND ERROR DETECTION OF TEMPLATE INSTANTIATIONS DURING COMPILATION OF C++ PROGRAMS

FIELD OF THE INVENTION

The present invention is directed to the field of object oriented programming, and in particular, to the processing of templates in C++ program compilation. The present invention provides a priority queue mechanism that sequences template instantiations and facilitates the generation of error messages that relate the instantiations.

BACKGROUND OF THE INVENTION

Compilation is that process that takes place in the computer in which a computer program written in a human readable programming language is translated, through a series of steps of lexical analysis, parsing and semantic analysis, into binary code capable of execution by a data processing system. Commonly, the compiler itself produces a number of compilation or translation units that are linked into the final output, an executable file, by a linker or linker/loader.

C++ is an object-oriented programming language in which programs are created using abstractions and constructs to create user-defined classes for defining the methods and variables for a particular type of object. All objects of a particular class are identical in form and behaviour but contain different data on their variables.

The C++ language also provides templates, which define families of classes and functions that are structurally identical but contain different kinds of data in their variables or function parameters. Each family is specified by a template declaration, and each member of the family is called an instantiation. Instantiations are created by the compiler.

A template declaration has two parts: the template parameters, and the class or function, written using the template parameter names. For example, this class template represents a list:

```
template<class ElementType>
class List: public SimpleList<ElementType>
{
// Add and remove elements from the list
//
  void add(ElementType&);
  void remove(ElementType&);
// Obtain the last element of the list. This causes a
ListViewer<ElementType>
// template to be instantiated.
//
  ElementType last( )
  {
  ListViewer<ElementType>it(*this);
  return it.last( );
  }
}
```

This template has a single template parameter, "ElementType", is a subclass of another templatized list, SimpleList, and has a function body that uses a third template, called ListViewer. The template is instantiated by specifying a set of template arguments that match the parameters, e.g., List<int>. Instantiation creates a new class, called, "List<int>", with ElementType replaced by int. This instantiated class behaves like a normal (non-template) class in post-parse phases, like type and overloading analysis.

In the course of instantiating a template, it may be necessary to instantiate others. In this case, before List<int> is instantiated, SimpleList<int> must be instantiated, and before the function body List<int>::viewer( ) can be instantiated, ListViewer<int> must be instantiated. The instantiation of SimpleList<int> and ListViewer<int> are respectively antecedents of (the instantiations of) List<int> and the body of List<int>::viewer( ). Similarly, the instantiation of List<int> is a dependent of the instantiation of SimpleList<int>. Because the programmer has not explicitly requested antecedent instantiations, error messages about antecedent instantiations must include information tracing back the dependent instantiations so that the programmer can understand the origin of the errors.

Current C++ compilers generate poor error diagnostics for templates. Cascading template instantiation error messages (or "traceback" messages) are not generated by most compilers, and even those error messages that are generated by current compilers are difficult to decipher.

One reason for this is that most compilers perform antecedent instantiations by recursively invoking the compiler. This means that the compiler suspends the instantiation currently being processed while the antecedent instantiation is being done.

If a compilation error occurs while performing the antecedent instantiation it can be difficult to produce additional error messages that relate that error to the dependent instantiation. For example, the following has a syntax error because member type Base<int>::ElementType cannot be used as a base class:

template<class T>class Base {typedef T ElementType; };
template<class T>class Derived: public Base<T>::ElementType { };
Derived<int>derived;

The antecedent error "Base<T>::ElementType is not a class" is not helpful without an additional error message "Error while instantiating Derived<int>". It is difficult to synthesize these error messages from a recursive invocation of the compiler.

Another drawback to recursive antecedent instantiation is the requirement for unbounded memory because of the recursion. For example, the following defines an array inductively: an array of dimension n is defined as a sub-class of an array of dimension n-1, and an instantiation of Array<100> would invoke the compiler 100 times recursively.

```
// Define an array template recursively.
//
template<int I>
class Array: public Array<i-1>
    {
    int E;
    };
// The base case.
//
template< >
class Array<0> { };
```

In addition to the foregoing, some current compilers delay the creation of error messages until the translation unit has been completed, or even until the entire program is linked. This makes it difficult to match error messages with source code fragments. The time lag between compilation and linking in conventional compilers exacerbates this problem.

SUMMARY OF THE INVENTION

It is therefore an object of the present invention to provide a mechanism for instantiating templates in sequence and to concurrently provide a means for tracing back the history of instantiation in order to create meaningful error messages that can be used to relate detected errors to locations in the source code.

Accordingly, in one aspect, the present invention provides a method for correctly sequencing template instantiation in a C++ programming environment where, upon locating, during processing of one code fragment, a dependency on an unprocessed template instantiation, the method includes the steps of interrupting the processing of the one code fragment, scheduling the template instantiation with a priority for processing and re-scheduling the one code fragment for reprocessing with a lower priority than the template instantiation.

In a further aspect, the invention provides a method, in a C++ programming environment, for instantiatiating templates in dependency sequence. This method includes the computer implemented steps of commencing a parse of original C++ code fragments. On encountering a template name in an original code fragment, the parse for that fragment is failed, and a first task to instantiate the template is generated and scheduled with a priority for processing. The failed parse is scheduled for re-processing with a lower priority than the first task. Preferably, the method also includes the steps of commencing processing of one instantiation. On encountering an antecedent name for which no antecedent instantiation exists, processing of the one instantiation is interrupted in order to generate a second task to instantiate the antecedent. The second task is scheduled with a priority for processing, and the one instantiation is re-scheduled with a lower priority than the second task.

According to a further aspect, the present invention provides a mechanism for sequencing template instantiation during compilation of C++ programs. The mechanism includes a priority queue, means to detect a requirement for an instantiation of an antecedent template during a parse or a first instantiation, means to create a task to process the antecedent instantiation, means to schedule the antecedent instantiation on the priority queue for processing and means to schedule the parse or first instantiation on the priority queue for re-processing with a lower priority than the antecedent instantiation.

According to a further aspect of the invention, a program storage device readable by a machine tangibly embodying a program of instructions executable by the machine for carrying out the above-described methods is also included.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

The present invention is directed to a mechanism that uses a priority queue, representing the order in which source code fragments are processed, in order to sequence template instantiations. A preferred embodiment of a priority queue is described in copending Canadian Patent Application No. 2,175,711 titled Incremental Compilation of C++ Programs (IBM Docket No. CA9-96-006), which is commonly assigned and is hereby incorporated herein by reference.

The priority queue (referred to as a WorkQueue in the above referenced co-pending application) is a persistent object included in a whole program representation stored, for example, in a program database. For the purposes of the present invention, persistence refers to the fact that the priority queue survives from the beginning of compilation until compilation terminates with or without errors, although the priority queue can be used for scheduling a number of tasks during compilation.

Figure 1:
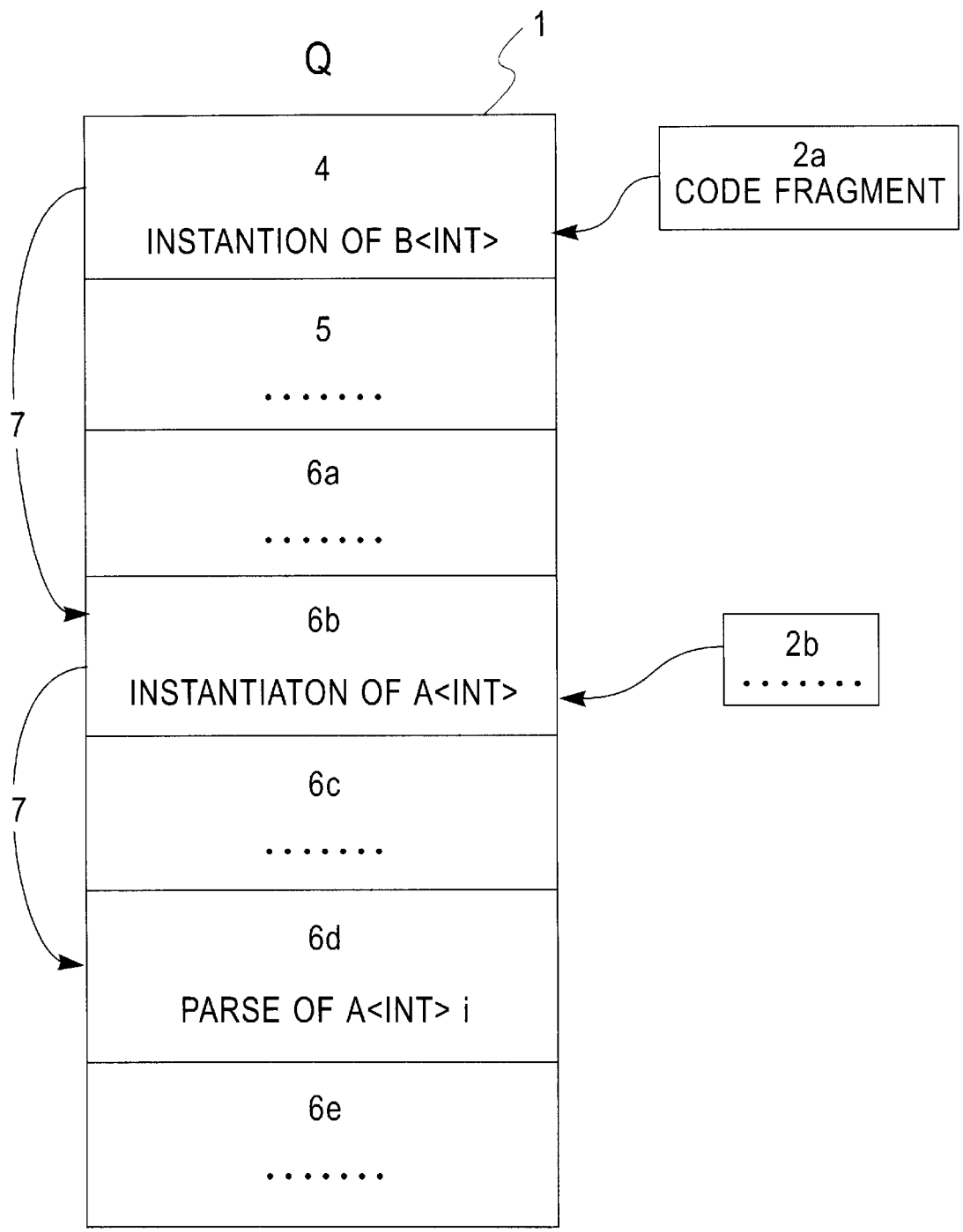
FIG. 1 is a schematic representation of a priority queue, according to the invention.

A schematic representation of the priority queue is illustrated in FIG. 1. Each code fragment (4, 5, 6) on the queue (1) is assigned a priority; the highest priority fragment is the next task to be processed.

Instantiations and failed parses (instantiations that have been returned to the queue for re-processing, as described below) are treated as any other task, and are removed from the queue for processing as their priority is reached.

Where parsing or analysis of a code fragment, generally referred to as (2), removed from the queue (1) encounters a name that requires further instantiation, the processing has a dependency on this antecedent. If no matching full instantiation for the antecedent exists, the dependent processing (2) will fail and be rescheduled back on the priority queue at a lower priority than the antecedent on which it depends to ensure that, further down the priority queue, the antecedent is processed before its dependent processing. After the full instantiation has succeeded, the terminated parse will be re-tried and the full antecedent instantiation will be found.

Parsing full instantiations may cause additional full instantiations. These are handled in the same manner; the additional instantiation is scheduled, and the current instantiation is failed and rescheduled.

Figure 2:
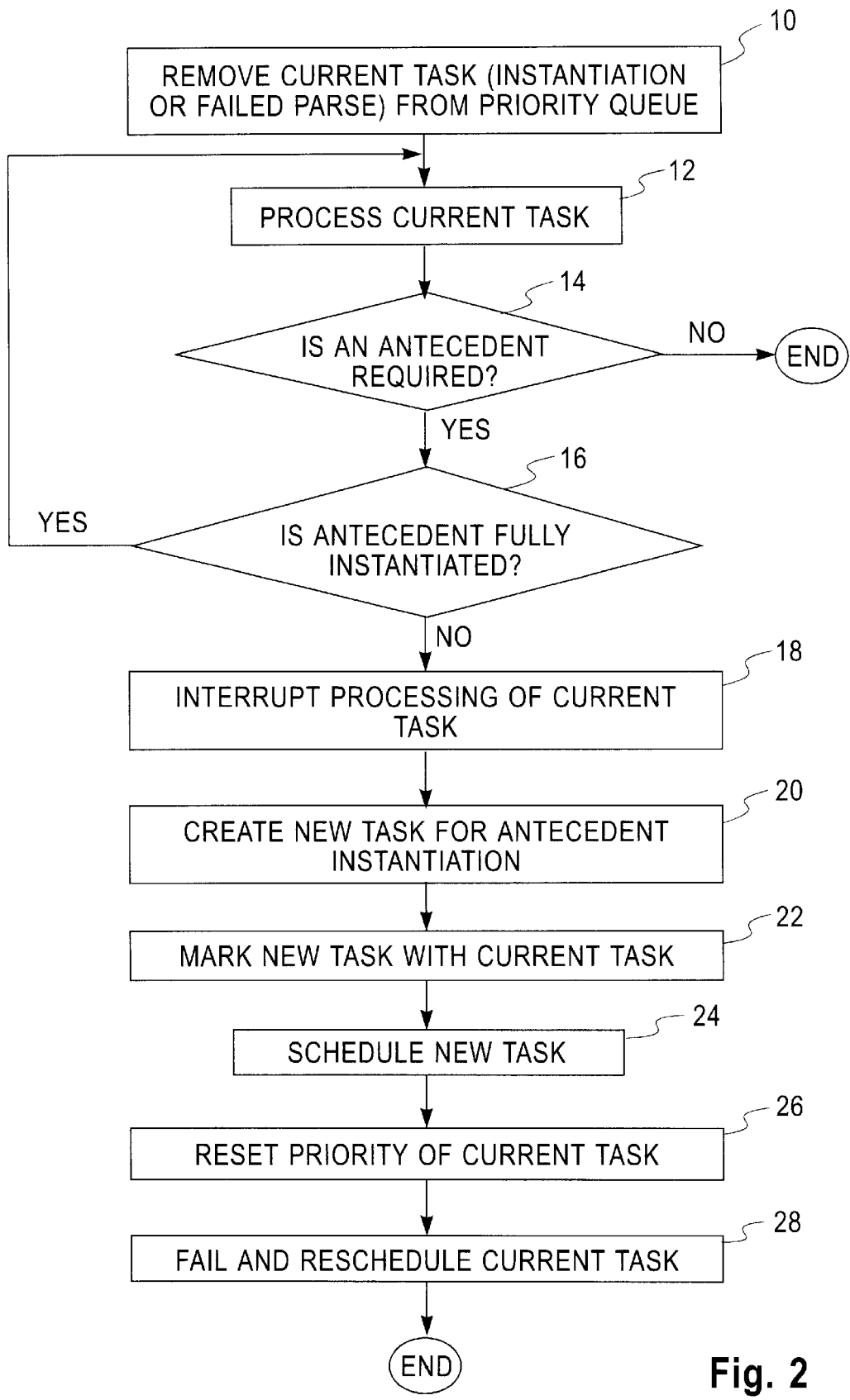
FIG. 2 is a flow diagram illustrating the computer implemented steps for sequencing template instantiation, according to the invention.

This method is illustrated in the flow diagram of FIG. 2. The current task, that is the task having the highest priority, is to parse or instantiate a template, and is removed from the priority queue (10) for processing (12). If the instantiation contains no antecedent reference, it will be processed in the normal manner (14). Similarly, if full instantiation of all required antecedents has succeeded, then processing on the template continues in the normal manner (14, 16).

However, where processing (parsing or semantic analysis) determines that an antecedent instantiation is necessary (16), processing is interrupted (18) and a new task for the antecedent instantiation is created (20). The new task is marked with the current task (22) as its dependent by setting a pointer from the antecedent task to the current task. The new task for the antecedent instantiation is scheduled on the priority queue (24), and then the priority of the dependent task is reset to be lower than that for the antecedent (26). Finally, the current task (for the dependent instantiation) is failed and the task is rescheduled on the priority queue (28).

Processing repeatedly removes tasks from the priority queue until the priority queue has stabilized. At this point the queue is either empty (which means compilation has been successful), or contains only failed parses or instantiations which are in error.

This use of a priority queue provides limits on the compiler resources (memory) required to perform the instantiation.

Furthermore, by marking an antecedent template instantiation with its dependent, the priority queue dependent chain gives the chronology of the instantiation, and it becomes very easy to generate historical information for error messages as discussed below. If a compilation error occurs while processing an antecedent instantiation, the chain of dependents is immediately available. This is illustrated schematically in FIG. 1. The arrows or pointers (7) between noncontiguous code fragments or tasks on the queue are representative of the marking of dependent instantiations or parses in each antecedent before it is scheduled on the priority queue.

The antecedent task is always a function or class instantiation. The dependent task can be a parse, or an instantiation. There are four cases for marking the antecedent with the dependent task. Using the following code fragment to describe these four cases:

```
template<class T>
class A: public B<T>
{
    void f( )
    {
        C<T> x;
        g( );
    }
    void g( ) { }
};
A<int> I;
```

From this example, where the antecedent is instantiation and a. the dependent is a class template instantiation, the instantiation of B<int> is marked with that of A<int>.
b. the dependent is a function body instantiation, the instantiation of C<int> is marked with that of the function body of A<int>::f( ).
c. the dependent is a normal parse, the instantiation of A<int> is marked with the parse of A<int>I.
d. the antecedent is a function instantiation and the dependent is a function template instantiation. If instantiating the body of A<int>::f( ), then the instantiation of the body of A<int>::g( ) is marked with that of A<int>::f( ).

The marking of antecedent tasks with their dependents gives the chronology of the instantiation, providing an easy way to generate error messages during full instantiation. For example:

```
template<class T>
struct Bar
{
};
template<class T>
struct Foo
{
    typename Bar<T>::X a;
};
Foo<int> I;
```

Because Bar<int> does not have a member X, the instantiation of Foo<int> will fail. The instantiation of Bar<int> is an antecedent of the instantiation of Foo<int>, which is an antecedent of the parse of "Foo<int>I"; after the instantiation of Bar<int> is completed, the instantiation of Foo<int> will be retried, and an error message is produced. First, the history is produced, by walking back through the chain of dependents, until there are no more, producing an error message of the form "instantiation error". Then the error message for the antecedent is produced. For this example, the error message is:

Line 12, Error occurred while instantiating Foo<int>
Line 9, Error, X is not a member of class Bar<T>.

By implementing a further embodiment of the present invention, it also becomes possible to detect possible divergent, non-terminating instantiations, as required by the C++ language definition. Possible divergent instantiations are template instantiations that do not terminate (for example, the instantiation of the Array<−1>).

The chain of dependent instantiations provides an efficient way to check for possible divergence. A divergence check works by scanning back along the chain of pending instantiations, and counting the number of times that the template was scheduled for a full instantiation. If the count exceeds a divergence threshold, an error is reported. The divergence threshold is an arbitrary specified by the user of selected by the compiler.

Using the following example:

```
template<int I>
class Stupid
{
    Digression<I + 1> v;
};
template<int I>
class Digression
{
    Stupid<I> v;
};
Stupid<0> divergence;
``` the instantiation sequence is Stupid<0>, Digression<1>, Stupid<1>, Digression<2>, and the instantiation diverges.

Figure 3:
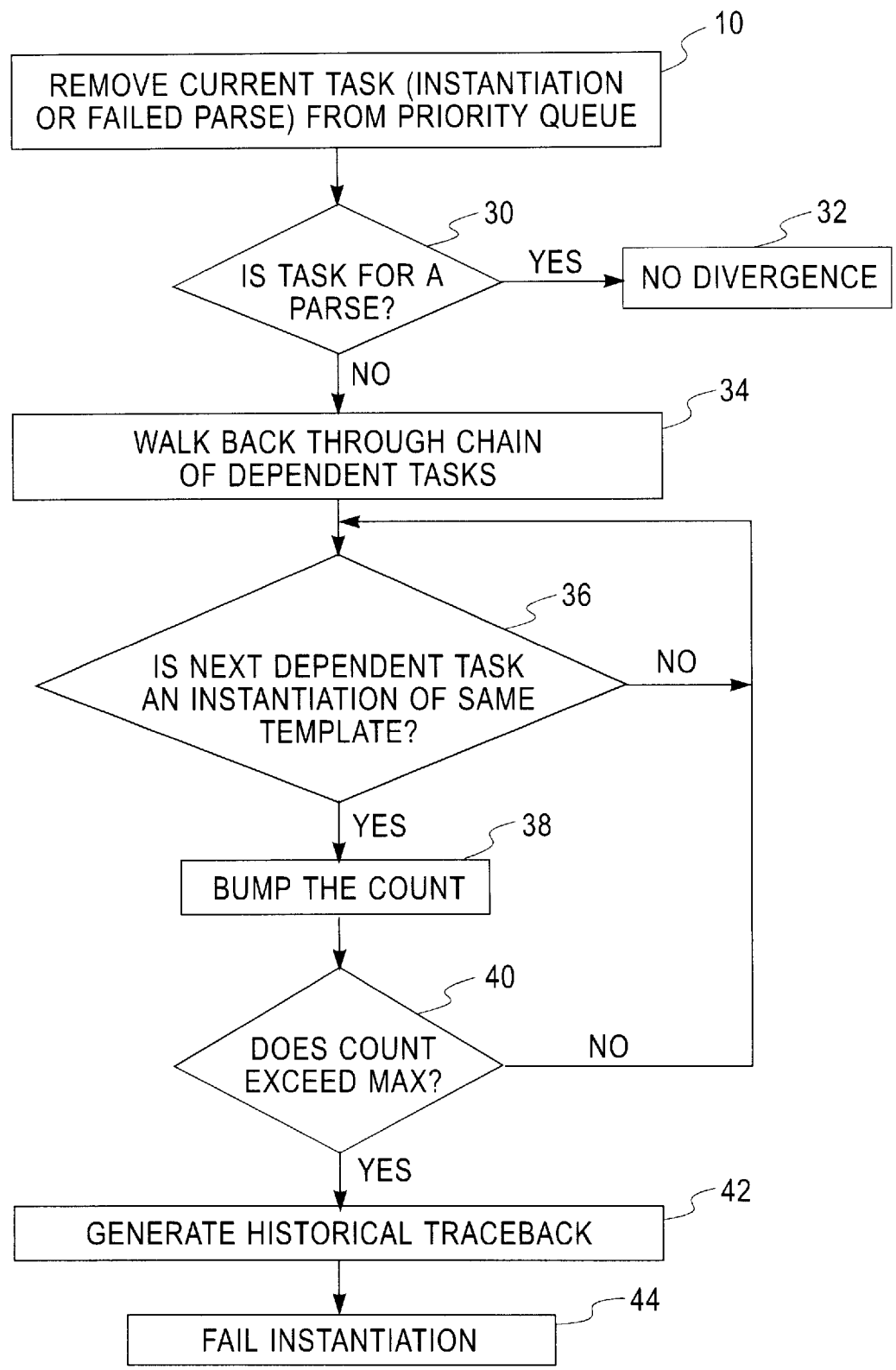
FIG. 3 is a flow diagram illustrating the computer implemented steps for detecting possible divergent instantiations, according to another aspect of the invention.

The divergence tests is done when a task is removed from the priority queue following the steps illustrated in FIG. 3.

A current task, which is an instantiation or a failed parse, is removed from the priority queue (10). If the task is for a parse then there is no divergence (30, 32). Otherwise the compiler walks back through the chain of dependent task (30, 34), and if a dependent task is an instantiation of the same template, increments a count (38). If the count exceeds the maximum allowable threshold then there is a possible divergence (40). The compiler then generates a history traceable (42) and fails the instantiation (44). If the count is below the threshold, there is no divergence (36; 40, 36).

Embodiments of the invention have been described in detail herein, but modifications to the invention obvious to those skilled in the art are intended to be covered by the appended claims.

The embodiments of the invention in which an exclusive property or privilege is claimed are defined as follows:

1. A method for correctly sequencing template instantiation in a C++ programming environment where, upon locating, during processing of one code fragment, a dependency on an unprocessed template instantiation, the method comprising:
   interrupting the processing of said one code fragment;
   scheduling the template instantiation with a priority for processing; and
   re-scheduling said one code fragment for re-processing with a lower priority than the template instantiation.

2. The method, according to claim 1, further comprising the step of marking said template with the dependency of the one code fragment before scheduling the template instantiation.

3. The method of claim 2, further comprising the step of generating a dependent chain chronology following instantiation of the template and the one code fragment from said marking.

4. A method, in a C++ programming environment, for instantiating templates in dependency sequence, comprising the computer implemented steps of:

(i) commencing a parse of original C++ code fragments;

(ii) on encountering a template name in an original code fragment, failing the parse of said original code fragment and generating a first task to instantiate the template;

(iii) scheduling the first task with a priority for processing; and (iv) scheduling the failed parse for reprocessing with a lower priority than the first task.

5. The method of claim 4, further comprising the step of repeating steps (ii) through (iv) until parsing of all original C++ code fragments has been completed or failed.

6. The method of claim 4, further comprising the steps of:

(v) commencing processing of one instantiation;

(vi) on encountering an antecedent name for which no antecedent instantiation exists, interrupting processing of said one instantiation and generating a second task to instantiate the antecedent;

(vii) scheduling the second task with a priority for processing; and (viii) re-scheduling said one instantiation for processing with a lower priority than the second task.

7. The method, according to claim 6, further comprising the step of repeating steps (v) through (viii) until a full instantiation is complete.

8. The method, according to claim 7, wherein the step of generating a second task to initiate the antecedent further comprises marking in said antecedent a dependency reference to said one instantiation, whereby to produce a chain of dependent instantiations to the original code fragment.

9. The method, according to claim 8, wherein on failure of the full instantiation, further comprising the steps of:

(vi) tracing through the chain of dependent instantiations to locate the original code fragment; and (vii) generating a message identifying the original code fragment.

10. The method, according to claim 8, further comprising the steps of:

(vi) tracing through the chain of dependent instantiations;

(vii) obtaining a count of each template is scheduled for full instantiation; and (viii) if the count exceeds a threshold, failing the instantiation.

11. The method according to claim 10, wherein step viii) further comprises generating a message identifying the chain of dependent instantiations.

12. A mechanism for sequencing template instantiation during compilation of C++ programs, comprising:

a priority queue;

means to detect a requirement for an instantiation of an antecedent template during a parse or a first instantiation;

means to create a task to process the antecedent instantiation;

means to schedule the antecedent instantiation on the priority queue for processing; and means to schedule the parse or first instantiation on the priority queue for re-processing with a lower priority than the antecedent instantiation.

13. The mechanism, according to claim 12, further comprising:

means for marking a dependency reference to the parse or the first instantiation in said task; and means for generating an error message identifying a sequence of dependent instanitiations in the event of failure of a full instantiation.

14. The mechanism, according to claim 13, further comprising means for calculating the number of dependencies on the antecedent template by accessing the dependency reference.

15. A program storage device readable by a machine, tangibly embodying a program of instructions executable by the machine for correcting sequencing template instantiation in a C++ programming environment where, upon locating, during processing of one code fragment, a dependency on an unprocessed template instantiation, said method steps comprising:

interrupting the processing of said one code fragment;

scheduling the template instantiation with a priority for processing; and re-scheduling said one code fragment for re-processing with a lower priority than the template instantiation.

16. A program storage device readable by a machine, tangibly embodying a program of instructions executable by the machine for instantiating templates in dependency sequence in a C++ programming environment, said method steps comprising:

(i) commencing a parse of original C++ code fragments;

(ii) on encountering a template name in an original code fragment, failing the parse of said original code fragment and generating a first task to instantiate the template;

(iii) scheduling the first task with a priority for processing;

(iv) scheduling the failed parse for re-processing with a lower priority than the first task;

(v) commencing processing of one instantiation (vi) on encountering an antecedent name for which no antecedent instantiation exists, interrupting processing of said one instantiation and generating a second task to instantiate the antecedent;

(vii) scheduling the second task with a priority for processing; and (viii) re-scheduling said one instantiation for processing with a lower priority than the second task.

17. A method for sequencing instantiation of generic structures in a programming language supporting priority queues comprising:

during processing of one code fragment, identifying a dependency on an uninstaniated generic structure;

upon identifying the dependency on the uninstaniated generic structure,
interrupting processing of said one code fragment, and scheduling processing of said uninstaniated generic structure and re-processing of said one code fragment, wherein re-processing of said one code fragment is given lower priority than processing of said uninstaniated generic structure.

18. The method of claim 17, further comprising the step of marking said generic structure with the dependency of the one code fragment before scheduling processing of said uninstaniated generic structure.

19. The method of claim 18, further comprising the step of:

following instantiation of said generic structure and said one code fragment, generating a dependent chain chronology based upon said marking.

20. The method of claim 17, wherein said programming language is C++ and said generic structure is a template.

21. A program storage device readable by a machine, tangibly embodying a program of instructions executable by the machine for performing method steps for sequencing instantiation of generic structures in a programming language supporting priority queues, said method steps comprising:

during processing of one code fragment, identifying a dependency on an uninstaniated generic structure;

upon identifying the dependency on the uninstaniated generic structure,
  interrupting processing of said one code fragment, and
  scheduling processing of said uninstaniated generic structure and re-processing of said one code fragment, wherein re-processing of said one code fragment is given lower priority than processing of said uninstaniated generic structure.

22. The program storage device of claim 21, said method steps further comprising the step of marking said generic structure with the dependency of the one code fragment before scheduling processing of said uninstaniated generic structure.

23. The program storage device of claim 22, said method steps further comprising the step of:

following instantiation of said generic structure and said one code fragment, generating a dependent chain chronology based upon said marking.

24. The program storage device of claim 21, wherein said programming language is C++ and said generic structure is a template.

* * * * *